United States Patent [19]

Mertens et al.

[11] Patent Number: 5,429,720
[45] Date of Patent: Jul. 4, 1995

[54] SOLVENT RECOVERY FROM WASTE OILS

[75] Inventors: James A. Mertens; Felipe A. Donate, both of Midland, Mich.

[73] Assignee: The Dow Chemical Company, Midland, Mich.

[21] Appl. No.: 187,361

[22] Filed: Jan. 26, 1994

Related U.S. Application Data

[63] Continuation of Ser. No. 14,300, Feb. 5, 1993, abandoned.

[51] Int. Cl.$^6$ ............................................. B01D 3/34
[52] U.S. Cl. ................................. 203/51; 203/52; 203/67; 203/68; 203/98; 570/178
[58] Field of Search ............... 203/51, 98, 67, 68, 203/52; 570/178; 252/DIG. 9; 208/348

[56] References Cited

U.S. PATENT DOCUMENTS

| | | | |
|---|---|---|---|
| 2,789,087 | 4/1957 | Cines | 203/67 |
| 3,101,304 | 8/1963 | Wiist | 203/69 |
| 4,029,552 | 6/1977 | Fozzard | 203/69 |
| 4,357,213 | 11/1982 | Mantulo et al. | 203/89 |
| 4,790,337 | 12/1988 | Fowler | 210/909 |
| 4,793,931 | 12/1988 | Stevens et al. | 210/636 |
| 4,898,645 | 2/1990 | Voight et al. | 203/67 |
| 4,950,364 | 8/1990 | Wismer | 203/50 |

FOREIGN PATENT DOCUMENTS 64-60694  3/1989  Japan .

OTHER PUBLICATIONS

CA 118(2):8875q, Weemes et al.
"Developments in the Alcohol/PFC Cleaning Process", B. H. Baxter, *Proceedings of the 1992 International CFC and Halon Alternatives Conference*, pp. 479–485.

*Primary Examiner*—Virginia Manoharan

[57] ABSTRACT

A distillation process for separating spent organic solvents such as trichloroethane or d-limonene from their contaminants such as oil is improved by the addition of a perfluorinated alkane or mixture of such alkanes to permit more efficient separation of the solvents from the oil.

8 Claims, No Drawings

SOLVENT RECOVERY FROM WASTE OILS

CROSS REFERENCE TO RELATED APPLICATION

This is a continuation of application Ser. No. 08/014,300, filed Feb. 5, 1993, now abandoned.

BACKGROUND OF THE INVENTION

The present invention is related to cleaning of used or spent solvents, particularly to the removal of oils from chlorinated solvents.

Chlorinated solvents are typically used in vapor degreasing to clean metal parts which are soiled with oils. In light of increasing regulations concerning the use and production of chlorinated solvents, it is desirable to recycle or reuse the solvents. However, in the cleaning process, the solvents typically become contaminated with oils and other foreign materials and are no longer suitable for use. Current processes generally distill the solvent/contaminant mixture and separate the water and solvent so obtained leaving behind the oil and other contaminants. Better separation than that provided by this process is desirable in some situations. Therefore, improved methods of cleaning the spent solvents are needed.

SUMMARY OF THE INVENTION

The present invention is an improved process for separating contaminants such as oils from solvents wherein the improvement comprises adding a perfluorinated alkane to the contaminated solvent prior to distillation wherein the perfluorinated alkane and solvent are insoluble in each other and have similar boiling points so that they may distill over together during distillation; separating the solvent from the perfluorinated alkane and returning the perfluorinated alkane to the distillation still; and recovering the purified solvent and perfluorinated alkane.

The perfluorinated alkane and solvent have similar boiling points lower than that of the contaminant(s) to permit the perfluorinated alkane and solvent to be distilled away from the contaminant. Further, the solvent must be soluble or miscible in the perfluorinated alkane at elevated temperatures and insoluble at cooler temperatures. The perfluorinated alkane has the additional characteristics of being inert and non-flammable.

The advantages of this process include the use of lower distillation temperatures than would be required if only the oil contaminant and solvent were present. As a consequence of the lower temperatures, tars are not formed. Effective recovery of both the oil and solvent are achieved due to the use of the perfluorinated alkane in the distillation process.

DETAILED DESCRIPTION OF THE ILLUSTRATIVE EMBODIMENTS

The use of chlorinated solvents in vapor degreasing and the recovery of these spent solvents by distillation is known to those skilled in the art. Typically the contaminated solvent will contain oils such as hydrocarbon based oils or silicon based oils which are soluble in the solvent. To remove these oils from the solvent, the contaminated solvent is heated in a distillation still. Since the oil has a higher boiling point than the solvent, the solvent distills over and is collected. Frequently, the solvent is also contaminated with water. Since water is not soluble in the solvent, it is typical to use gravimetric separation to remove the water from the solvent after distillation from the contaminant. This usually involves cooling.

In the improvement of the present invention, a perfluorinated alkane is added to the contaminated solvent prior to distillation. The perfluorinated alkane is selected to have a boiling point similar to that of the solvent being cleaned. The difference in boiling points is preferably no more than 30° C. degrees, more preferably no more than 10° C. It is most preferred that the boiling point of the perfluorinated alkane is greater than that of the solvent. Additionally, the perfluorinated alkane is substantially insoluble with the contaminants at distillation temperatures. It is soluble or miscible with the solvent at distillation temperatures, but substantially insoluble at lower temperatures. The amount of perfluorinated alkane added to the contaminated solvent is any which will allow an increase in the contaminant removed as compared to that removed in the absence of the perfluorinated alkane. This amount is preferably about 50 volume percent of the amount of solvent to be cleaned.

Since the solvent and perfluorinated alkane have similar boiling points, when the mixture containing contaminated solvent and perfluorinated alkane is distilled, the solvent and perfluorinated alkane distill over together. The contaminant, having a higher boiling point, is left behind. Upon cooling, the solvent and perfluorinated alkane become insoluble and are separated by known techniques such as gravimetric separation. The perfluorinated alkane is returned to the distillation still and the cleaned solvent is recovered for further use. A sufficient amount of the perfluorinated alkane is retained in the distillation still to prevent the oil from decomposing at the temperatures of the still. Additionally, the oil can be gravimetrically separated from the perfluorinated alkane allowing the alkane to be reused.

The perfluorinated alkanes preferably used in this process are $C_{6-20}$ perfluorinated branched or linear alkanes and mixtures thereof. They have average molecular weights ranging from about 340 to about 1000 and having boiling points ranging from about 50° up to about 250° C. at atmospheric pressure. Examples of useful perfluorinated alkanes include a mixture of alkanes with an average molecular weight of about 340 and a boiling point of about 56° C. containing predominantly $C_6F_{14}$; a mixture of alkanes with an average molecular weight of about 388 and a boiling point of about 80° C. containing predominantly $C_7F_{16}$; a mixture of alkanes with an average molecular weight of about 415 and a boiling point of about 97° C. containing predominantly $C_7F_{16}$ and $C_8F_{18}$; a mixture of alkanes with an average molecular weight of about 435 and a boiling point of about 101° C. containing predominantly $C_8F_{18}$; a mixture of alkanes with an average molecular weight of about 650 and a boiling point of about 155° C. containing predominantly $C_{12}F_{26}$; and a mixture of alkanes with an average molecular weight of about 670 and a boiling point of about 174° C. containing predominantly $C_{10}F_{22}$ through $C_{13}F_{28}$. Such compounds are available commercially from the 3M Company under the Fluorinert TM trademark. These compounds are inert, nonpolar, low in toxicity and nonflammable. Various perfluorinated aliphatic compounds having from 6 to 20 carbon atoms are available. For example, Fluorinert TM FC-72 fluid has an average molecular weight of 340 and a boiling point of 56° C.; Fluorinert ™ FC-84 fluid has an average molecular weight of 388 and a boiling point of 80° C.; Fluorinert ™ FC-77 fluid has an average molecular weight of 415 and a boiling point of 56° C.; Fluorinert ™ FC-104 fluid has an average molecular weight of 435 and a boiling point of 101° C.; Fluorinert ™ FC-75 fluid has an average molecular weight of 420 and a boiling point of 102° C.; Fluorinert ™ FC-40 fluid has an average molecular weight of 650 and a boiling point of 155° C.; and Fluorinert ™ FC-43 fluid has an average molecular weight of 670 and a boiling point of 174° C.

The solvents which are treated by the present invention are hydrocarbon solvents which have similar boiling points as one or more of the perfluorinated alkanes and are insoluble in the perfluorinated alkanes at temperatures below the common boiling points. Examples of solvents include hydrocarbons such as terpenes and chlorinated hydrocarbons. Preferred examples of chlorinated solvents include perchloroethylene (b.p. 121° C.), trichloroethylene (b.p. 87° C.), methylene chloride (b.p. 40° C.) and 1,1,1-trichloroethane (b.p. 72°–88° C.).

The following examples are provided to illustrate the invention, but should not be considered as limiting it in any way. Unless stated otherwise, all parts and percentages are by volume.

EXAMPLE 1

A mixture of 9 ml of inhibited 1,1,1-trichloroethane, 1 ml machine oil and 9 ml of Fluorinert ™ FC-77, a mixture of perfluorinated alkanes (predominantly $C_7$ and $C_8$ alkanes) having a boiling point of 97° C. and an average molecular weight of 415 are mixed in a distillation flask. The mixture of oil and 1,1,1-trichloroethane separate from the Fluorinert ™ liquid. The solution is heated to boiling with a condenser connected to a receiving flask. The vapors condense and are collected as a two phase mixture. The distillation is stopped when 75 percent of the volume is recovered. Most of the lower layer, containing the Fluorinert ™ liquid is returned to the distillation flask and the distillation is resumed. When the same point is reached again, the distillation is stopped and the oil is tested for retained solvent. Less than one percent of the 1,1,1-trichloroethane was left in the oil.

EXAMPLE 2

A sample of 75 ml of 1,1,1-trichloroethane and 25 ml of mineral oil was distilled with Fluorinert ™ FC-84, a mixture of perfluorinated alkanes (predominantly $C_7$ alkanes) having a boiling point of 80° C. and an average molecular weight of 388 in a continuous operation with the distilled perfluorinated alkane being returned to the distillation flask. The distillation was stopped yielding an oil layer containing less than 0.5 percent 1,1,1-trichloroethane.

EXAMPLE 3

A mixture of 30 ml of d-limonene and 145 ml of Fluorinert ™ FC-43, a mixture of perfluorinated alkanes (predominantly $C_{10-12}$ alkanes) having a boiling point of 174° C. and an average molecular weight of 670 are mixed in a 250 ml boiling flask equipped with a connecting adapter. The boiling flask was connected to an apparatus composed of a distillation head with thermocouple well, a condenser and a water-jacketed receiver. The receiver was equipped with an overflow line and a connecting adapter. The adapter was equipped with a small siphon line and a stopcock, and was positioned slightly below the overflow line. This adapter was connected to the adapter in the boiling flask by means of a short piece of tubing. This connection allowed distillate collected in the receiver to flow back into the boiling flask when the stopcock was kept open. The overflow line drained into a 100 ml graduated cylinder. A heating mantle was placed underneath the boiling flask to heat the mixture. A cloudy liquid distilled over in the temperature range of 155° C. to 165° C. and began to separate into two layers. The stopcock was opened briefly when the liquid level in the receiver was approaching that of the overflow line to allow liquid to return to the boiling flask. This procedure was repeated until the two liquid layers in the receiver were clear. At this point, the stopcock was closed and the distillate allowed to accumulate in the receiver to enable the top layer to drain through the overflow line into the graduated cylinder. The distillation was stopped when the interface between the layers could barely be discerned. A total of 28 ml of d-limonene was collected. The fluorinated alkane was not detected in the product by capillary gas chromatography.

EXAMPLE 4

The procedure in Example 3 was followed with the exception that 30 ml of Sunicut 331 oil (a hydrotreated naphthenic cutting oil with a viscosity of 190 SUS at 100° F.) was mixed with the perfluorinated alkane and d-limonene. A total of 29 ml of d-limonene was collected. The oil left in the boiling flask was separated from the perfluorinated alkane using a separatory funnel. The perfluorinated alkane was detected in neither the oil nor the d-limonene by capillary gas chromatography.

What is claimed is:

1. A process of separating a hydrocarbon solvent or a chlorinated hydrocarbon solvent from an oil comprising the steps of:
    a) adding to a mixture of the solvent and the oil in a distillation still a $C_6$–$C_{20}$ perfluorinated branched or linear alkane;
    b) codistilling the solvent and the perfluorinated alkane, and leaving the oil undistilled and leaving sufficient perfluorinated alkane undistilled to prevent the oil from decomposing at the temperatures of the distillation process;
    c) collecting the perfluorinated alkane and solvent as a two-phase mixture;
    d) separating the distilled perfluorinated alkane from the distilled solvent; and
    e) returning the distilled perfluorinated alkane to the distillation still.

2. The process of claim 1 wherein the solvent is a chlorinated solvent.

3. The process of claim 2 wherein the chlorinated solvent is selected from the group consisting of perchloroethylene, trichloroethylene, methylene chloride and 1,1,1-trichloroethane.

4. The process of claim 1 wherein the solvent is 1,1,1-trichloroethane and the perfluorinated alkane comprises $C_7F_{16}$ and $C_8F_{18}$, has an average molecular weight of 415 and a boiling point of 97° C.

5. The process of claim 1 wherein the solvent is 1,1,1-trichloroethane and the perfluorinated alkane comprises $C_7F_{16}$, has an average molecular weight of 388 and a boiling point of 80° C.

6. The process of claim 1 wherein the solvent is d-limonene and the perfluorinated alkane comprises $C_{10}F_{22}$ through $C_{12}F_{26}$, has an average molecular weight of 670 and a boiling point of 174° C.

7. The process of claim 1 wherein the oil is a hydrocarbon based oil or a silicon based oil.

8. The process of claim 7 wherein the boiling point of the perfluorinated alkane is greater than that of the solvent.

* * * * *